United States Patent
Matsumoto

(10) Patent No.: US 9,551,541 B2
(45) Date of Patent: Jan. 24, 2017

(54) INDOOR UNIT OF AIR-CONDITIONING APPARATUS

(71) Applicant: Takashi Matsumoto, Tokyo (JP)

(72) Inventor: Takashi Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 837 days.

(21) Appl. No.: 13/851,167

(22) Filed: Mar. 27, 2013

(65) Prior Publication Data

US 2014/0020860 A1      Jan. 23, 2014

(30) Foreign Application Priority Data

Jul. 18, 2012   (JP) ................................ 2012-159540

(51) Int. Cl.
*F28F 27/00*      (2006.01)
*F24F 1/00*       (2011.01)
*F24F 11/00*      (2006.01)

(52) U.S. Cl.
CPC ............. *F28F 27/00* (2013.01); *F24F 1/0007* (2013.01); *F24F 11/0034* (2013.01); *F24F 11/0078* (2013.01); *F24F 11/0079* (2013.01); *F24F 2001/0048* (2013.01); *F24F 2011/0063* (2013.01); *F24F 2221/38* (2013.01); *Y02B 30/746* (2013.01)

(58) Field of Classification Search
None
See application file for complete search history.

(56) References Cited

U.S. PATENT DOCUMENTS

| | | | | |
|---|---|---|---|---|
| 5,180,333 A | * | 1/1993 | Shyu ........................ | F24F 11/00 236/49.3 |
| 7,084,774 B2 | * | 8/2006 | Martinez ............ | B60H 1/00742 236/44 C |
| 8,864,447 B1 | * | 10/2014 | Humphrey .............. | F04D 17/04 415/118 |

(Continued)

FOREIGN PATENT DOCUMENTS

| | | |
|---|---|---|
| JP | 01-147244 A | 6/1989 |
| JP | 05-035877 A | 2/1993 |

(Continued)

OTHER PUBLICATIONS

Honeywell, Color CCD Camera User Guide, Document 900.0557, Revision 1.00, Mar. 2006.*

(Continued)

*Primary Examiner* — Christopher E Everett
(74) *Attorney, Agent, or Firm* — Posz Law Group, PLC

(57) ABSTRACT

When user face information and user air-conditioning information are stored in advance via a portable information terminal and a face of a user is located within a face recognition range of an indoor imaging device, an indoor unit of an air-conditioning apparatus recognizes the face. In addition, when it is determined that the face of the user corresponds to the face of a first user represented by first user information stored in advance, the indoor unit of the air-conditioning apparatus blows conditioned air that satisfies a first user air-conditioning environment represented by first user air-conditioning information set for the first user toward the first user.

15 Claims, 11 Drawing Sheets

(56) References Cited

U.S. PATENT DOCUMENTS

| | | | |
|---|---|---|---|
| 2008/0065291 A1* | 3/2008 | Breed | B60N 2/002 |
| | | | 701/36 |
| 2011/0067098 A1* | 3/2011 | Nelson | G06F 21/32 |
| | | | 726/21 |
| 2011/0155365 A1* | 6/2011 | Wiese | F24F 7/013 |
| | | | 165/244 |
| 2012/0158189 A1 | 6/2012 | Cho et al. | |
| 2012/0158203 A1* | 6/2012 | Feldstein | G06F 1/3231 |
| | | | 700/295 |
| 2012/0169584 A1* | 7/2012 | Hwang | H04L 12/2818 |
| | | | 345/156 |
| 2013/0204408 A1* | 8/2013 | Thiruvengada | G06F 3/011 |
| | | | 700/90 |

FOREIGN PATENT DOCUMENTS

| | | |
|---|---|---|
| JP | 06-323599 A | 11/1994 |
| JP | 07-271482 A | 10/1995 |
| JP | 10-232044 A | 9/1998 |
| JP | 2003-042521 A | 2/2003 |
| JP | 2005-106355 A | 4/2005 |
| JP | 2006-220405 A | 8/2006 |
| JP | 2009-139010 A | 6/2009 |
| JP | 2010-025359 A | 2/2010 |
| JP | 2010-107114 A | 5/2010 |
| JP | 2010-266188 A | 11/2010 |
| JP | 2011-169536 A | 9/2011 |
| KR | 10-2012-0067607 A | 6/2012 |

OTHER PUBLICATIONS

Feldmeier, Mark Christopher, Personalized Building Comfort Control, Thesis, Massachusetts Institute of Technology, Sep. 2009.*
Feldmeier, Mark Christopher, "Personalized building comfort control", pp. 278, PhD Thesis, published 2009.*
Extended Search Report issued on Nov. 4, 2013 in the corresponding EP application No. 13166735.4-1602 (English translation).
Office Action dated Jul. 31, 2014 issued in corresponding KR patent application No. 10-2013-0042824 (and English translation).
Office Action issued Dec. 9, 2014 in corresponding JP patent application No. 2012-159540 (and English translation).
Japanese Office Action mailed on Jul. 7, 2015 in the corresponding JP application No. 2012-159540. ( English translation attached).
Chinese Office Action issued on Jul. 3, 2015 in the corresponding CN application No. 201310192773.X ( English translation attached).

* cited by examiner

F I G. 5
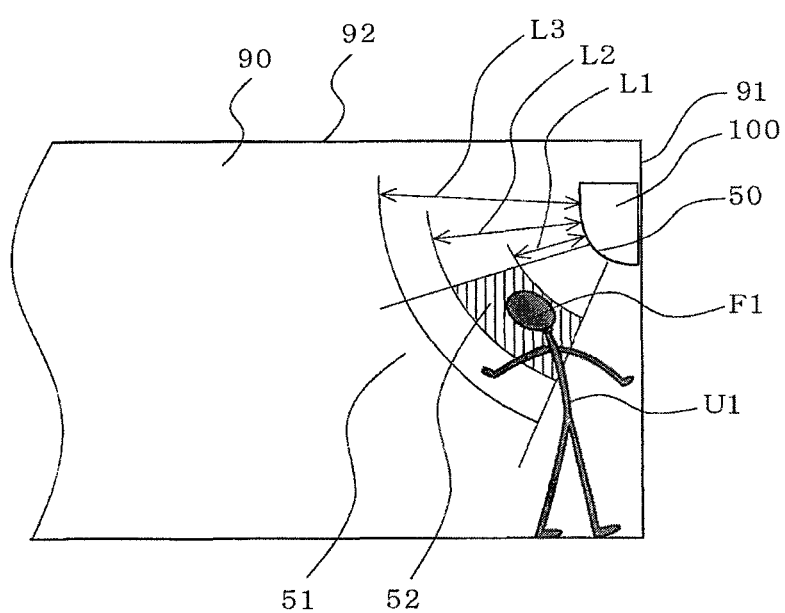

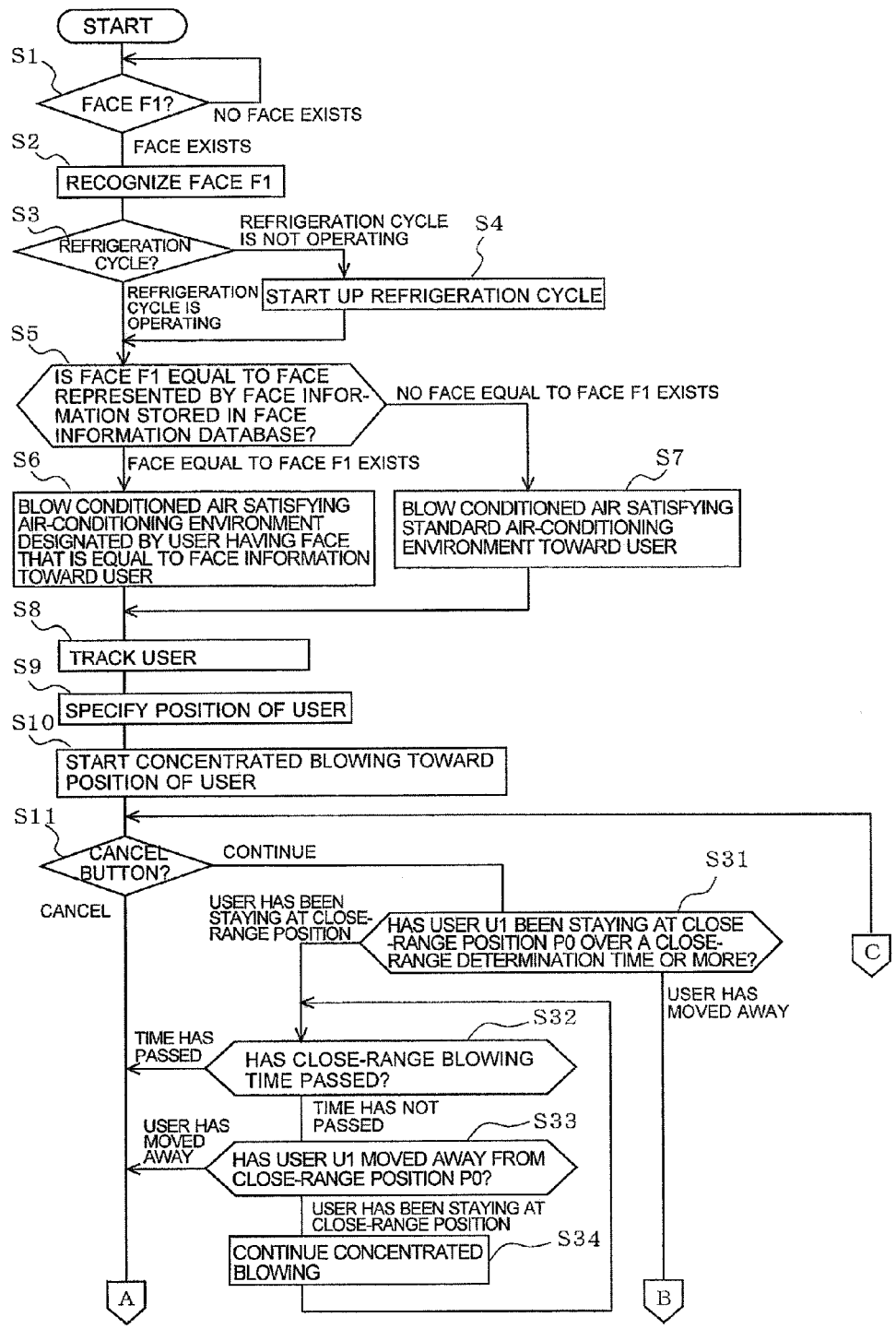

INDOOR UNIT OF AIR-CONDITIONING APPARATUS

TECHNICAL FIELD

The present invention relates to an indoor unit of an air-conditioning apparatus, and more specifically, the present invention relates to an indoor unit of an air-conditioning apparatus that includes imaging means capable of capturing images of inside of the room where the indoor unit is provided.

BACKGROUND ART

Hitherto, indoor units of air-conditioning apparatuses (hereinafter, referred to as indoor units) that detect the position of a person who is in the room where the indoor unit is provided (hereinafter, referred to as an "in-room person") and send air so as not to be directed to the in-room person (hereinafter, referred to as a "user") or, on the contrary, so as to be directed to the user, in order to improve the comfort to the user, has been known.

An indoor unit that not only detects the position of a user but also detects the activity state of the user and controls the temperature, outlet amount, and flow direction of conditioned air on the basis of the detected activity state, that is, an indoor unit that sends air toward the user in a concentrated manner when it is detected that the amount of activity of the user is increased due to light exercise or light physical labor, in order to remove the quantity of heat generated by the activity and to suppress the increase in the body temperature so as not to make the user feel it is hot, is disclosed (see, for example, Patent Literature 1).

CITATION LIST

[Patent Literature]
[Patent Literature 1] Japanese Unexamined Patent Application Publication No. 6-323599 (Pages 3 to 5, FIG. 2)

SUMMARY OF INVENTION

Technical Problem

However, the indoor unit disclosed in Patent Literature 1 does not send conditioned air in a concentrated manner toward a user whose activity amount is not increased and performs normal air sending to the user. The preference for air conditioning environment varies from user to user since the sensible temperature varies from user to user. For example, for normal air sending, a user whose activity amount is not increased may feel it is hot (so-called "a person who is sensitive to the heat"), and on the contrary, a user whose activity amount is not increased may feel it is cold (so-called "a person who is sensitive to the cold"). Thus, individual users need to operate a remote control (remote maneuvering unit) to achieve a preferred air-conditioning environment. Under such circumstances, there has been a demand for achieving a user's preferred air-conditioning environment and maintaining the comfort, without performing setting operations.

Furthermore, there has also been a demand for quickly feeling cooler (or warmer) immediately after a user comes from hot (or cold) outside into a room without looking for a remote control (remote maneuvering unit) and performing start-up operation. In particular, there has been a demand for temporarily, quickly feeling cooler (or warmer) immediately after a user comes into a room from a bathroom after taking a bath or from hot (or cold) outside.

In order to meet the above-mentioned demands, the present invention provides an indoor unit of an air-conditioning apparatus that is capable of achieving an air-conditioning environment preferred by a user, without operation using a remote control.

Solution to Problem

An indoor unit of an air-conditioning apparatus according to the present invention includes a main unit that includes an air inlet and an air outlet and that is mounted on a wall inside a room; a fan that sucks indoor air from the air inlet and that forms an air path extending to the air outlet; a heat exchanger that is arranged in the air path and that implements part of a refrigeration cycle; an air flow direction adjusting device that is arranged at the air outlet and that adjusts a blowing direction of conditioned air in the heat exchanger; an indoor imaging device that captures an image inside the room; and a controller that controls at least one of the fan, the refrigeration cycle, and the air flow direction adjusting device on the basis of user face information and user air-conditioning information that are transmitted by a portable information terminal and the image captured by the indoor imaging device. When a face of a person is located within a face recognition range, which is a specific field of view, and the indoor imaging device recognizes the face of the person, the controller compares the face of the person with faces represented by the user face information that is stored in advance and that is transmitted from the portable information terminal, and in a case where the controller determines that the face of the person corresponds to a face of a specific user of the faces represented by the user face information, the controller controls at least one of the fan, the refrigeration cycle, and the air flow direction adjusting device to blow conditioned air that satisfies an air-conditioning environment represented by user air-conditioning information set for the specific user toward the person.

Advantageous Effects of Invention

When the face of a person is located within a face recognition range, an indoor unit of an air-conditioning apparatus according to the present invention recognizes the face. In the case where the indoor unit determines that the person corresponds to a user set in advance by a portable information terminal, the indoor unit blows conditioned air that satisfies an air-conditioning environment set by the user. Thus, the comfort to the user is improved. For example, in the case where the face of a person who is sensitive to the heat is located within the face recognition range, the indoor unit performs control such that an air-conditioning environment registered in advance for the person who is sensitive to the heat (for example, cooler and higher-speed air is sent in a concentrated manner) is achieved, or in the case where the face of an elderly person is located within the face recognition range, the indoor unit performs control such that an air-conditioning environment registered in advance for the elderly person (for example, medium-temperature and low-speed swing air is sent (in a diffused manner)) is achieved.

BRIEF DESCRIPTION OF DRAWINGS

FIG. 5 is a side view illustrating the outline of face detection in the indoor unit of the air-conditioning apparatus according to Embodiment 1 of the present invention.

FIG. 10 is a flowchart for illustrating processing operations in air-conditioning environment control for an indoor unit of an air-conditioning apparatus according to Embodiment 2 of the present invention.

DESCRIPTION OF EMBODIMENTS

[Embodiment 1]

Figure 1:
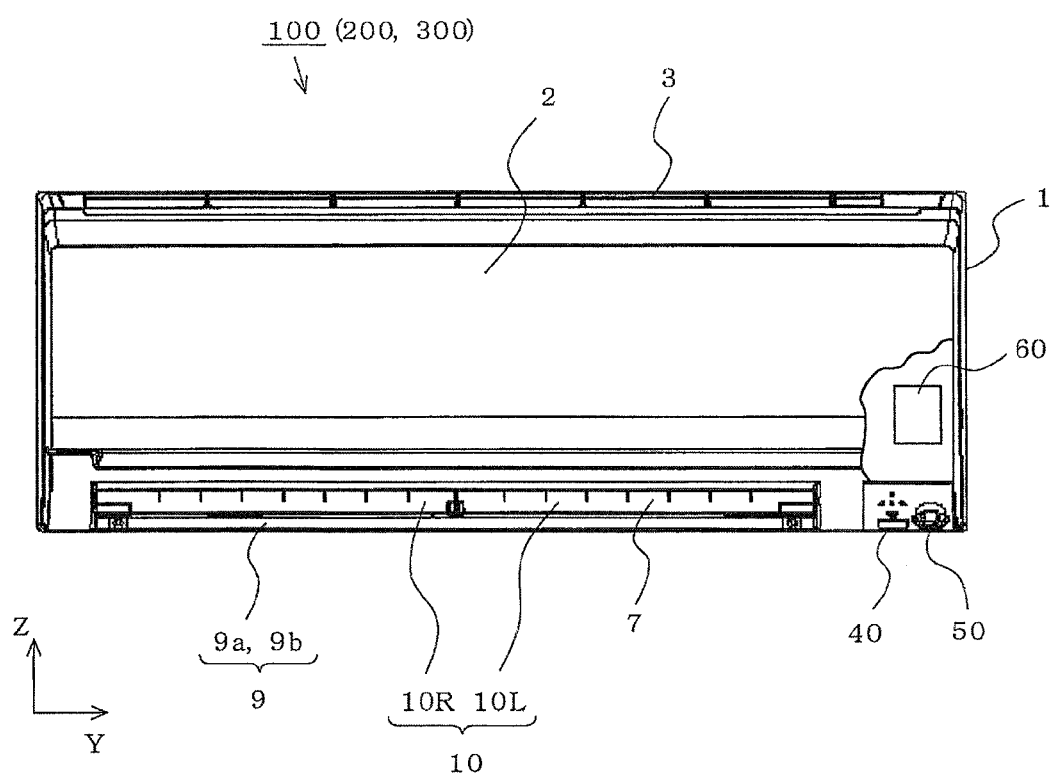
FIG. 1 is a front view illustrating an indoor unit of an air-conditioning apparatus according to Embodiment 1 of the present invention.
Figure 2:
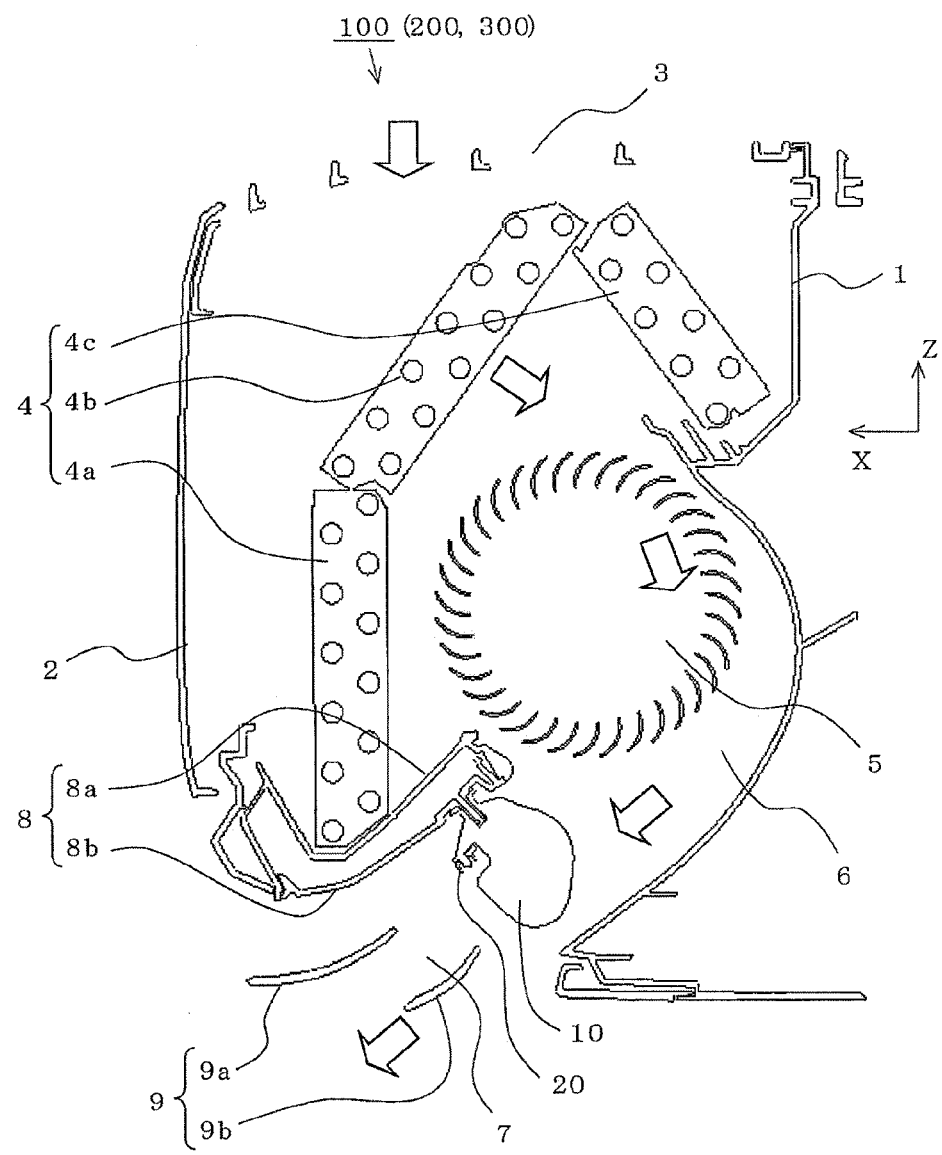
FIG. 2 is a cross-sectional side view illustrating the indoor unit of FIG. 1.
Figure 3:
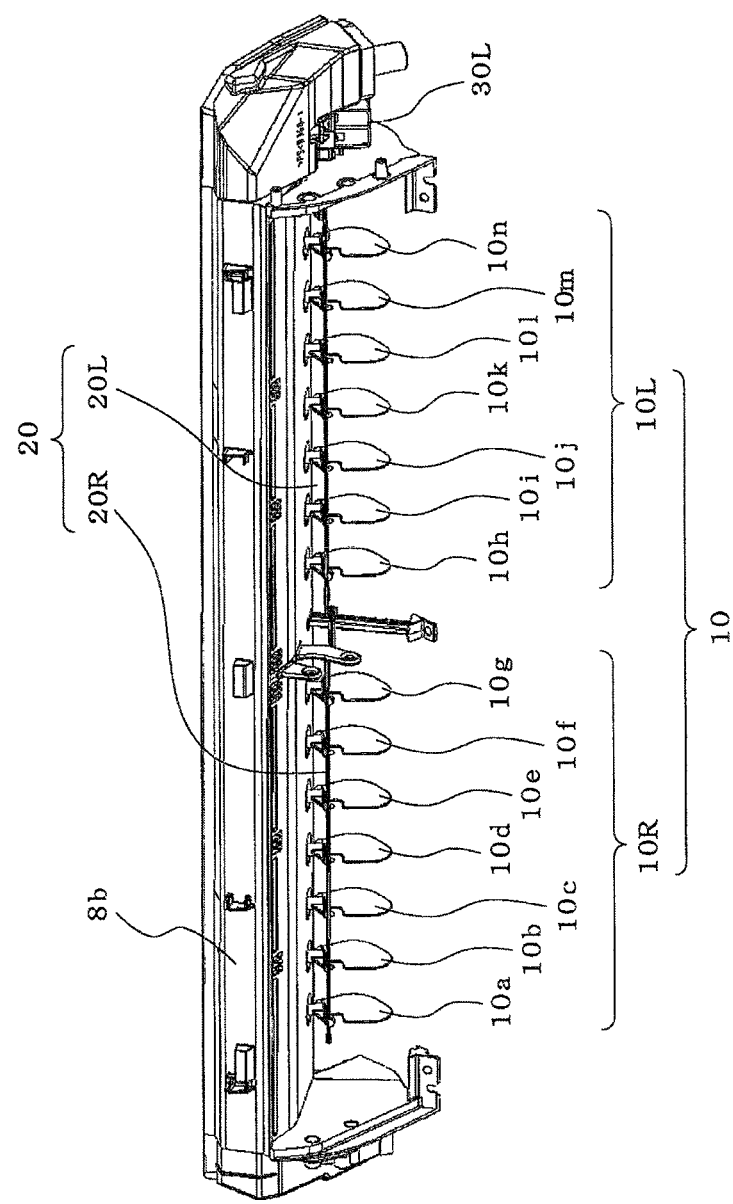
FIG. 3 is a perspective view illustrating a part (near an air outlet) of the indoor unit of FIG. 1.
Figure 6:
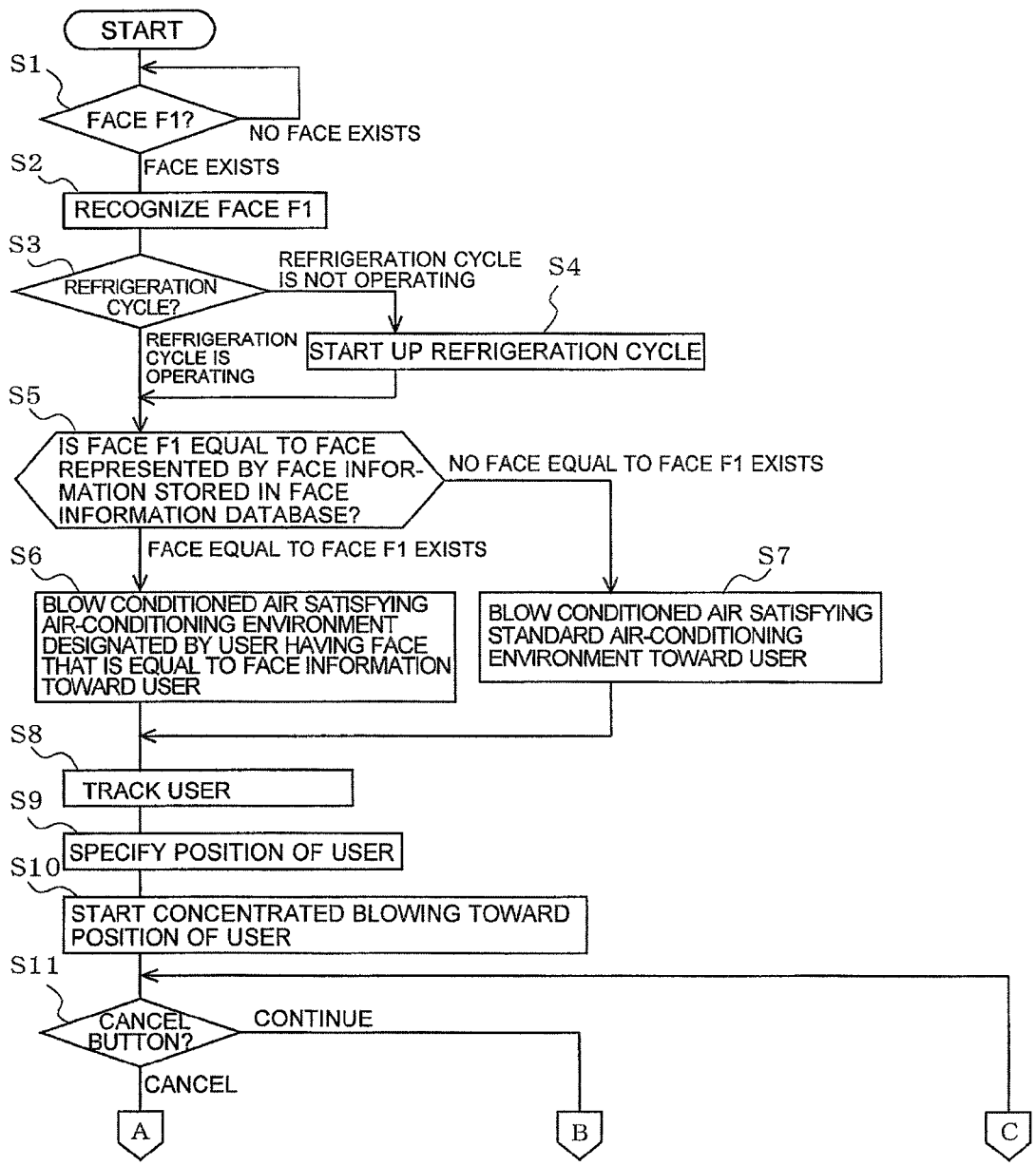
FIG. 6 is a flowchart for illustrating processing operations in air-conditioning environment control for the indoor unit of the air-conditioning apparatus according to Embodiment 1 of the present invention.
Figure 7:
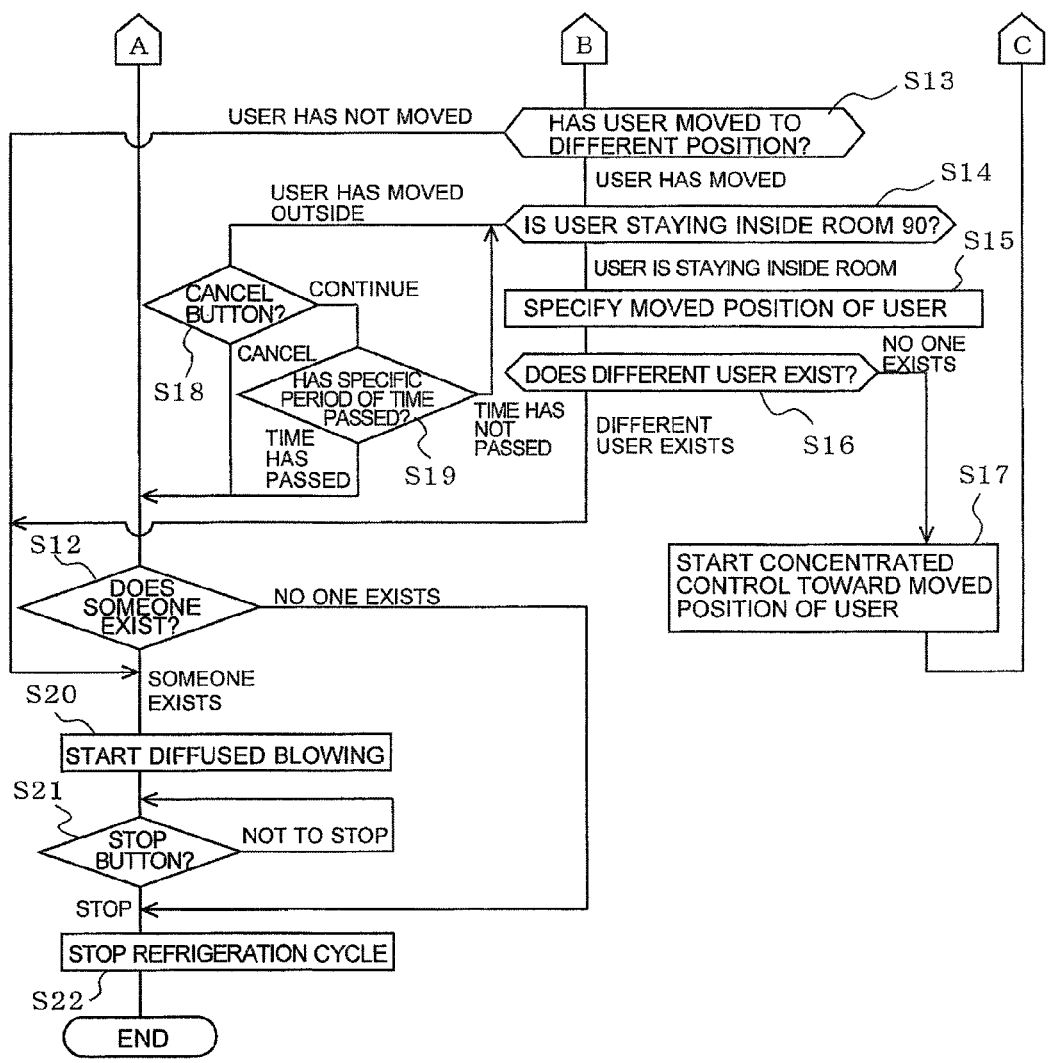
FIG. 7 is a flowchart for illustrating processing operations in the air-conditioning environment control for the indoor unit of the air-conditioning apparatus according to Embodiment 1 of the present invention.

FIGS. 1 to 9 explain an indoor unit of an air-conditioning apparatus according to Embodiment 1 of the present invention. FIG. 1 is a front view illustrating an indoor unit. FIG. 2 is a cross-sectional side view illustrating the indoor unit. FIG. 3 is a perspective view illustrating an extracted part (near an air outlet) of the indoor unit. FIGS. 4A and 4B includes front views illustrating a portable information terminal that transmits information to the indoor unit. FIG. 5 is a side view illustrating the outline of face detection. FIGS. 6 and 7 are flowcharts for illustrating processing operations in air-conditioning environment control. FIGS. 8A to 9C are plan views illustrating the air flow in the air-conditioning environment control. The individual drawings are schematically illustrated and the present invention is not limited by the illustrated forms.

(Indoor Unit)

Referring to FIGS. 1 to 3, an indoor unit 100 of an air-conditioning apparatus includes a main unit 1, an upper part of which an air inlet 3 is provided and a lower part of which an air outlet 7 is provided, a front panel 2 that can be freely opened and closed to cover the front face of the main unit 1, a fan 5 that sucks indoor air from the air inlet 3 and that forms an air path 6 extending to the air outlet 7, and a heat exchanger 4 that is arranged on the upstream side of the fan 5 (in the proximity to the air inlet 3).

A receiving device 40 that receives signals from a portable information terminal 70 (see FIG. 4) and an indoor imaging device 50 that captures images of inside of the room where the indoor unit is provided are arranged beside the air outlet 7 on the front side of the main unit 1.

The form and the position of the receiving device 40 and the indoor imaging device 50 in the present invention are not limited. For example, the receiving device 40 and the indoor imaging device 50 may be arranged in a central portion of the front panel 2 or the like. Furthermore, an alert device (not illustrated) for informing the operation condition of the indoor unit by audio or video is provided.

(Heat Exchanger)

The heat exchanger 4 is a part of a component member that implements a refrigeration cycle. The heat exchanger 4 includes a heat exchanger front portion 4a, which is a portion that is substantially parallel to the front panel 2, a heat exchanger upper front portion 4b, which is a portion that is diagonally upper near the front side of the fan 5, and a heat exchanger upper rear portion 4c, which is a portion that is diagonally upper near the rear side of the fan 5. A drain pan 8 is arranged below the heat exchanger front portion 4a. An upper surface 8a of the drain pan 8 forms a drain pan surface that actually receives a drain, and a lower surface 8b of the drain pan 8 forms a front side of the air path 6.

(Air Flow Direction Adjusting Device: Up/Down Air Flow Direction Plate)

A left-side left/right air flow direction plate group 10L and a right-side left/right air flow direction plate group 10R (collectively or individually referred to as a "left/right air flow direction plate 10") that adjust the horizontal (left/right) blowing direction of indoor air conditioned by the heat exchanger 4 (hereinafter, referred to as "conditioned air") are arranged in the air path near the air outlet 7. An up/down air flow direction plate 9 (a front up/down air flow direction plate 9a and a rear up/down air flow direction plate 9b are collectively referred to as an "up/down air flow direction plate 9") that adjusts the vertical (up/down) blowing direction of conditioned air is arranged at the air outlet 7, which is located at the end of the air path 6. The left/right air flow direction plate 10 and the up/down air flow direction plate 9 function as an air flow direction adjusting device.

The "left-side" plate and the "right-side" plate represent a plate that can be viewed on the left hand side and a plate that can be viewed on the right hand side, respectively, when the room is viewed from the indoor unit 100, that is, when the direction toward the front panel 2 is viewed from the rear side of the main unit 1.

(Air Flow Direction Adjusting Device: Left/Right Air Flow Direction Plate)

The right-side left/right air flow direction plate group 10R includes left/right air flow direction plates 10a, 10b, . . . , and 10g. The right-side left/right air flow direction plate group 10R is rotatably arranged at the lower surface 8b of the drain pan 8 and is connected to a right-side connecting bar 20R. The left-side left/right air flow direction plate group 10L includes left/right air flow direction plates 10h, 10i, . . . , and 10n and is connected to a left-side connecting bar 20L.

The right-side left/right air flow direction plate group 10R and the right-side connecting bar 20R form a link mechanism, and the left-side left/right air flow direction plate group 10L and the left-side connecting bar 20L form a link mechanism. Right-side driving means (not illustrated) is connected to the right-side connecting bar 20R, and left-side driving means 30L is connected to the left-side connecting bar 20L.

Accordingly, when the right-side connecting bar 20R is translated by the right-side driving means, the left/right air flow direction plates 10a, 10b, . . . , and 10 g move rotationally while keeping parallel to one another. Furthermore, when the left-side connecting bar 20L is translated by the left-side driving means 30L, the left/right air flow direction plates 10h, 10i, . . . , and 10n move rotationally while keeping parallel to one another. Thus, conditioned air can be blown in the same direction over the entire width of the air outlet 7, conditioned air can be blown in opposite directions between one half and the other half of the width the air outlet 7, the directions being away from each other, or conditioned air can be blown in opposite directions between one half and the other half of the width of the air outlet 7, the directions colliding with each other.

The left/right air flow direction plate 10 in the present invention is not limited by the illustrated form. The number of plates of the left/right air flow direction plate 10 is not particularly limited. Furthermore, the left/right air flow direction plate 10 may be divided into three or more groups. In this case, the individual groups may be rotatably connected to corresponding connecting bars, and the connecting bars may be translated independently.

(Up/Down Air Flow Direction Plate)

The up/down air flow direction plate 9 has a rotational center that is parallel to a horizontal direction (Y-direction) and is rotatably arranged at the main unit 1. The rotational axis of the front up/down air flow direction plate 9a and the rotational axis of the rear up/down air flow direction plate 9b are connected by a link mechanism or a gear mechanism and are moved rotationally by a common driving motor.

The up/down air flow direction plate 9 in the present invention is not limited by the illustrated from. The front up/down air flow direction plate 9a and the rear up/down air flow direction plate 9b may be moved rotationally by individual driving motors. Furthermore, the front up/down air flow direction plate 9a and the rear up/down air flow direction plate 9b may each be divided at the center thereof in the left/right direction, and the divided four plates may be moved rotationally in an independent manner.

(Portable Information Terminal)

Referring to FIG. 4, the portable information terminal 70 that transmits information to the indoor unit 100 of the air-conditioning apparatus includes face imaging means 71 for imaging the face of a user, air-conditioning environment setting means 72 by which a user sets air-conditioning environment, and transmitting means 73 for transmitting user face information regarding the face of a user imaged by the face imaging means 71 and user air-conditioning information regarding an air-conditioning environment set by the air-conditioning environment setting means 72 to the receiving device 40 of the indoor unit 100.

That is, since normally a plurality of users exist, for example, first user face information IF1 regarding a face F1 of a first user U1 and first user air-conditioning information IC1 regarding a first user air-conditioning environment C1 set for the first user U1 are transmitted, for the first user U1, to the receiving device 40, and second user face information IF2 regarding a face F2 of a second user U2 and second user air-conditioning information IC2 regarding a second user air-conditioning environment C2 set for the second user U2 are transmitted, for the second user U2, to the receiving device 40.

The form of the portable information terminal 70 is not limited as long as it has the functions described above. In the case of the portable information terminal 70 of a general-purpose type (for example, a tablet terminal, a smartphone, etc.), an application dedicated to the indoor unit 100 of air-conditioning apparatus 100 is started up prior to start of operation.

Figure 4A:
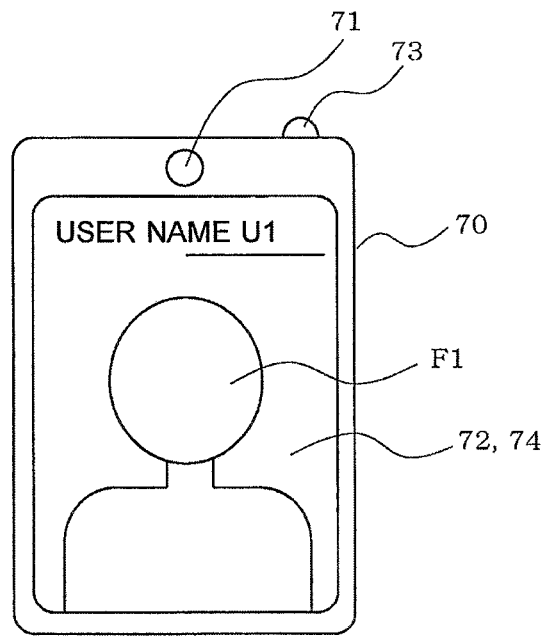
FIG. 4A is a front view illustrating a portable information terminal that transmits information to the indoor unit of the air-conditioning apparatus according to Embodiment 1 of the present invention.

Referring to FIG. 4A, the name of the first user U1 and the face (front side) of the first user U1 are displayed on a display unit 74. The name of the first user U1 is input by operation using the air-conditioning environment setting means 72 on the basis of an instruction displayed on the display unit 74 immediately after an application of the portable information terminal 70 is started up (immediately after activation). The face of the first user U1 is obtained by imaging by the face imaging means 71 in accordance with operation using the air-conditioning environment setting means 72 based on an instruction displayed on the display unit 74. In the case where the display unit 74 is a touch panel, since the air-conditioning environment setting means 72 is arranged on the rear side of the display unit 74, the display unit 74 may be regarded as having, in appearance, the function of the air-conditioning environment setting means 72.

Figure 4B:
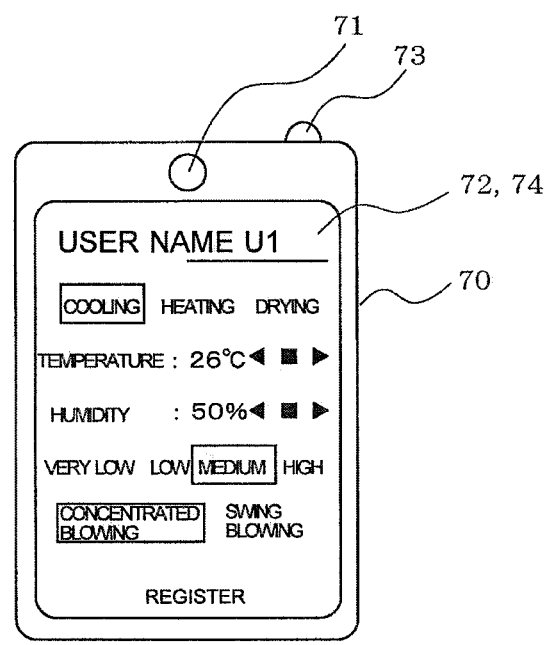
FIG. 4B is another front view illustrating a portable information terminal that transmits information to the indoor unit of the air-conditioning apparatus according to Embodiment 1 of the present invention.

Referring to FIG. 4B, the first user air-conditioning information IC1 set for the first user U1 is displayed on the display unit 74.

That is, information representing "cooling" operation is displayed below the name of the first user U1. That is, by touching the letters "cooling," the letters are changed into bold letters placed within a frame.

Then, as an air-conditioning environment preferred by the first user U1, "a triangle whose apex is positioned on the left side thereof, a square, and a triangle whose apex is positioned on the right side thereof" representing "a change to a lower temperature, no change, and a change to a higher temperature," respectively, and a changed temperature are displayed, for preset temperature, as change direction (shift direction) with respect to a standard air-conditioning environment in cooling operation. For example, by touching twice the "triangle whose apex is positioned on the left side thereof," which represents a change to a lower temperature, "26° C." is set for the first user U1, with respect to the standard preset temperature "28° C."

For humidity, triangles and a square representing "a change to a lower humidity, no change, and a change to a higher humidity" (similar to temperature) and a changed humidity "50%," which is a value set by touching as described above are displayed.

For air speed, "medium" is displayed. That is, by touching the letters "medium," the letters are changed into bold letters placed within a frame.

For an air sending mode, "concentrated blowing" is displayed. That is, by touching the letters "concentrated blowing," the letters are changed into bold letters placed within a frame.

Furthermore, the letters "register" is displayed. When a user touches the letters "register," the displayed first user air-conditioning information IC1 is transmitted to the indoor unit 100 and is stored. The description provided above is merely an example of the display unit 74 (the air-conditioning environment setting means 72) and the present invention is not limited by the display explained above.

(Controller)

A controller 60 is provided in the indoor unit 100. The controller 60 stores user face information and user air-conditioning information transmitted from the portable information terminal 70 and controls at least one of the fan 5, a refrigeration cycle, and the air flow direction adjusting device (the up/down air flow direction plate 9 and the left/right air flow direction plate 10) on the basis of the user face information, the user air-conditioning information, and an image captured by the indoor imaging device 50 (hereinafter, referred to as "air-conditioning environment control").

The first user face information IF1 and the first user air-conditioning information IC1 for the first user U1 and the second user face information IF2 and the second user air-conditioning information IC2 for the second user U2, which are transmitted from the portable information terminal 70, are stored in advance in the controller 60 (more accurately, a storing device (not illustrated) connected to the controller 60), and a user face information database and a user air-conditioning information database are formed in the controller 60.

Since the indoor unit 100 of the air-conditioning apparatus realizes an air-conditioning environment corresponding to the preference of the first user U1 (or the second user U2) and the like, the first user U1 (or the second user U2) first (for example, immediately after entering the room where the indoor unit 100 is provided) needs to cause the controller 60 to recognize "the first user U1 (or the second user U2)." Thus, the first user U1 (or the second user U2) approaches the indoor unit 100 to cause the indoor unit 100 to recognize the face of the first user U1 (or the second user U2).

Then, the controller 60 determines whether or not the person who approaches the indoor unit 100 and causes the indoor unit 100 to recognize the face corresponds to a person having a face represented by user face information stored in the controller 60. When the controller 60 determines that the person corresponds to the first user U1, the controller 60 controls a component member implementing a refrigeration cycle, the fan 5, the left/right air flow direction plate 10, or the up/down air flow direction plate 9 so that the first user air-conditioning environment C1 represented by the first user air-conditioning information IC1 can be achieved.

(Recognition of Face of User)

FIG. 5 explains the outline of recognition of the face of a user. The indoor unit 100 is arranged at a position near a ceiling surface 92 of one wall (hereinafter, referred to as a "back wall") 91 inside the room 90 where the indoor unit 100 is provided.

The indoor imaging device 50 (for example, a CCD camera of 300,000 pixels) has a diagonally downward field of view 51. When the face F1 of the first user U1 is located within a range (expressed by oblique lines in FIG. 5, and referred to as a "face recognition range") 52 between a distance L1 and a distance L2 (>L1) from the indoor imaging device 50 in the field of view 51, the controller 60 recognizes the face F1.

Furthermore, when the first user U1 is located in a position closer to the indoor imaging device 50 than a distance L3 (>L2), the controller 60 determines that "the first user U1 is trying to cause the indoor unit 100 to recognize that the first user U1 is sensitive to the heat or sensitive to the cool." In the case where the face F1 is not located within the face recognition range 52 even when the first user U1 is located at a position closer to the indoor imaging device 50 than the distance L3, the controller 60 causes the alert means, which is not illustrated, to inform the fact that the face F1 is not located within the face recognition range 52.

For example, a voice message "no face is recognized" or "come closer" is alerted. Alternatively, a lamp indicating that no face is recognized is lit or blinking. Instead of alerting using voice, lighting a lamp, or making the lamp blink, the alert means may display letters or images.

Meanwhile, in the case where the face F1 is not recognized (the face F1 is not located within the face recognition range 52) for a specific period of time (for example, 10 seconds) even when the first user U1 is located at a position closer to the indoor imaging device 50 than the distance L3 (>L2), it is determined that "the first user U1 is not trying to cause the indoor unit 100 to recognize the first user U1 " or "the first user U1 does not intend to start up the indoor unit 100."

At this time, the alert means may inform the fact that "the face F1 is not recognized." For example, in the case where a refrigeration cycle is operating, a message "the air-conditioning apparatus will operate in a normal mode" is alerted using voice. Alternatively, a lamp indicating "operation in a normal mode" is lit or blinking.

(Tracking of User)

After recognizing the face F1 of the first user U1, the controller 60 tracks the first user U1 on the basis of the image of the first user U1 captured by the indoor imaging device 50, and specifies the moved position (hereinafter, referred to as a "user position") P1. Then, the controller 60 sends conditioned air that satisfies the first user air-conditioning environment C1 represented by the first user air-conditioning information IC1 locally toward the specified first user position P1 in a concentrated manner (concentrated air sending).

Immediately after the recognition of the face F1, the first user U1 moves (is moving) in a direction that is away from the indoor unit 100. Thus, the position of the first user U1 after the moving finishes, that is, the position at which the first user U1 stops or sits down is identified as the first user position P1.

(Air-Conditioning Environment Control)

The air-conditioning environment control executed by the controller 60 will be described with reference to the flowcharts illustrated in FIGS. 6 and 7 and the plan views illustrated in FIGS. 8 and 9.

Referring to FIG. 6, when the face F1 of the first user U1 is located in the face recognition range 52 (S1), the controller 60 recognizes the face F1 (S2). For the convenience of explanation, the case where the face F1 of the first user U1 is recognized is explained. However, in the case where the face F2 of the second user U2 exists, the controller 60 recognizes the face F2.

In the case where a refrigeration cycle is not operating at the time when the face F1 is recognized (S3), the refrigeration cycle is started up (S4).

Furthermore, the controller 60 compares the recognized face F1 with each of faces represented by user face information stored in advance in the user face information database and determines whether or not the face F1 corresponds to any of the faces representing by user face information stored in the user face information database (S5).

For example, in the case where the face F1 corresponds to a face represented by the first user face information IF1, the controller 60 controls the fan 5, the left/right air flow direction plate 10, the up/down air flow direction plate 9, and the like to blow conditioned air that satisfies the first user air-conditioning environment C1 (hereinafter, referred to as "conditioned air") toward the first user U1 (S6).

Meanwhile, in the case where the recognized face F1 does not corresponds to any of the faces represented by the user face information stored in advance in the user face information database, the controller 60 controls the fan 5, the left/right air flow direction plate 10, the up/down air flow direction plate 9, and the like to blow conditioned air that satisfies a standard air-conditioning environment toward the user (S7).

Furthermore, the controller 60 tracks the movement of the first user U1 (S8), and specifies the first user position P1, which is the position at which the first user U1 stops or sits down (S9). Then, the controller 60 controls the attitude of the left/right air flow direction plate 10 and the up/down air flow direction plate 9 to send conditioned air that satisfies the first user air-conditioning environment C1 locally toward the first user position P1 in a concentrated manner (concentrated blowing) (S10).

Thus, since concentrated blowing toward the first user position P1 starts, the first user U1 is able to receive, in a concentrated manner, conditioned air that satisfies the first user air-conditioning environment C1 stored in advance and preferred by the first user U1.

In the case where the recognized face F1 does not corresponds to any of the faces represented by the user face information stored in advance in the user face information database, the controller 60 tracks the user having the face F1 and blows conditioned air that satisfies the standard air-conditioning environment toward the user in a concentrated manner.

Referring to FIG. 7, in the case where the first user U1 or a different user operates a remote control, which is not illustrated, or the portable information terminal 70 to press a button for stopping the concentrated blowing while the concentrated blowing is being performed (S11 described in FIG. 6), the controller 60 stops the concentrated blowing and starts diffused blowing (S20). That is, the controller 60 starts to perform diffused blowing, not blowing conditioned air toward the first user position P1 in a concentrated manner.

Meanwhile, in the case where the button for stopping the concentrated blowing is not pressed during the execution of concentrated blowing (S11), the controller 60 continues to track the position of the first user U1 whose face F1 is recognized.

In the case where the controller 60 determines that the first user U1 stays at the first user position P1 without moving to a different position during a specific period of time (for example, thirty minutes) (S13), the controller 60 stops concentrated blowing and starts diffused blowing (S20). That is, it is assumed that the first user U1 is cooled down (or warmed up) by concentrated blowing during the specific period of time and the first user U1 is able to feel enough comfort even after switching to cooling (or heating) by diffused blowing is performed.

In the case where the controller 60 determines that the first user U1 moved to a different position before the specific period of time (for example, thirty minutes) has passed (S13), the controller 60 further determines whether the first user U1 is located inside the room 90 or outside the room (S14).

In the case where the controller 60 determines that the first user U1 is located inside the room 90, the controller 60 specifies a first user position P3, which is a moved position of the first user U1 (S15). In the case where the controller 60 determines that no other user is located inside the room 90 (S16), the controller 60 starts concentrated blowing toward the first user position P3, instead of concentrated blowing toward the first user position P1 (S17, see FIG. 9A).

Figure 9A:
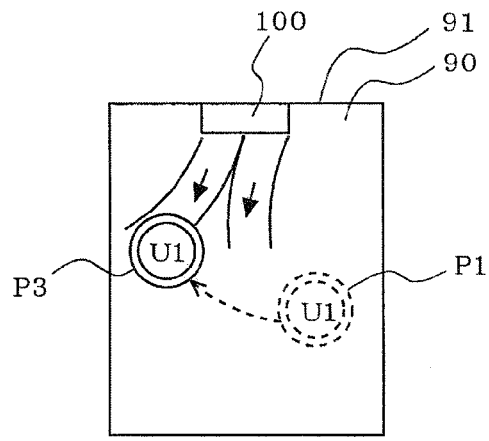
FIG. 9A is a plan view illustrating the flow of air in the air-conditioning environment control for the indoor unit of the air-conditioning apparatus according to Embodiment 1 of the present invention.
Figure 9B:
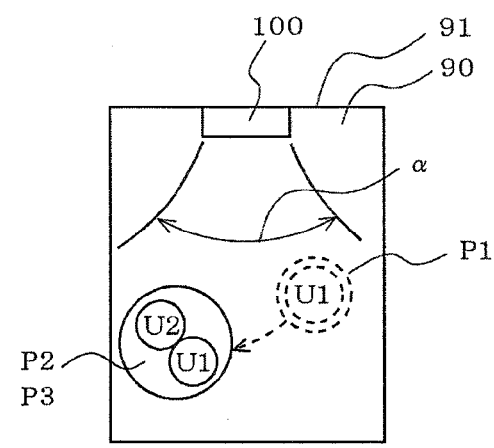
FIG. 9B is another plan view illustrating the flow of air in the air-conditioning environment control for the indoor unit of the air-conditioning apparatus according to Embodiment 1 of the present invention.
Figure 9C:
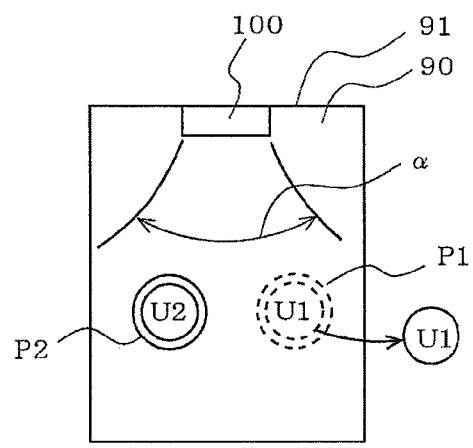
FIG. 9C is yet another plan view illustrating the flow of air in the air-conditioning environment control for the indoor unit of the air-conditioning apparatus according to Embodiment 1 of the present invention.

Meanwhile, in the case where the controller 60 determines that a different user (for example, the second user U2) is located inside the room, the controller 60 stops concentrated blowing and starts diffused blowing (S20, see FIG. 9B). That is, the comfort to the second user U2 is not hindered.

After it is determined in S14 that the first user U1 moved outside the room 90, in the case where the button for canceling concentrated blowing is pressed (S18), as long as the first user U1 is located inside the room 90 (S12), the controller 60 cancels concentrated blowing and starts diffused blowing (S20). Meanwhile, after the first user U1 moved outside the room 90, when a specific period of time (for example, ten minutes) has passed (S19), the controller 60 stops concentrated blowing and starts diffused blowing (S20, see FIG. 9C) as long as a different user (for example, the second user U2) is located inside the room 90 (S12).

That is, after the first user U1 moves outside the room 90, the controller 60 performs switching to diffused blowing after the specific period of time (time) has passed since start of concentrated blowing as long as someone (for example, the second user U2) is located inside the room 90, irrespective of whether or not the first user U1 coming back into the room 90.

In the case where it is determined in S12 that no one is located (no user is located) in the room, the controller 60 stops the refrigeration cycle (S22). In the case where it is determined in S12 that a user is located inside the room, the controller 60 stops concentrated blowing and starts diffused blowing (S20).

Furthermore, in the case where during the execution of diffused blowing, someone (for example, the second user U2) operates a remote control, which is not illustrated, or the portable information terminal 70 to press a button for stopping diffused blowing (a stop button of cooling, heating, or the like) (S21), the controller 60 stops the operation of the refrigeration cycle (S22).

(Concentrated Blowing)

Figure 8A:
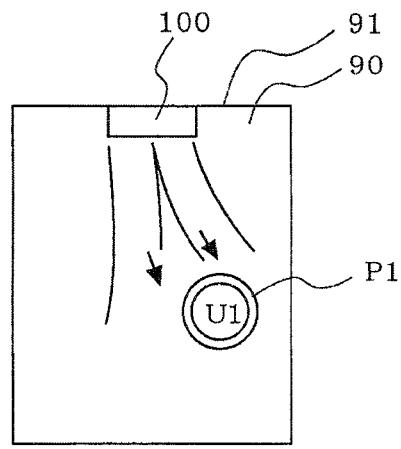
FIG. 8A is a plan view illustrating the flow of air in the air-conditioning environment control for the indoor unit of the air-conditioning apparatus according to Embodiment 1 of the present invention.

Referring to FIG. 8A, in the case where the first user position P1 is in a left portion inside the room 90 (left-hand side viewed from the indoor unit 100), both the right-side left/right air flow direction plate group 10R and the left-side left/right air flow direction plate group 10L (see FIG. 3) are set to the attitude in which conditioned air is blown to the first user position P1 (attitude for concentrated blowing). Thus, the first user U1 receives a larger amount of conditioned air over a longer period of time in a concentrated manner than the case where conditioned air is blown substantially uniformly over inside the room 90 (diffused blowing).

That is, the first user U1 does not need to look for a remote control (not illustrated) or the portable information terminal 70 and to perform an operation for pressing a start button for cooling (or heating) provided on the remote control or the portable information terminal 70, and cooling (or heating) operation can be started only by bringing, by the first user U1, the face F1 closer to the indoor unit 100. Moreover, when the first user U1 moves to a specific position and stands or sits down the specific position, the specific position is automatically specified as the first user position P1, and cool air (or warm air) is sent toward the first user position P1. Thus, the first user U1 does not need to operate the portable information terminal 70 or the like to cause conditioned air to reach the position where the first user U1 is located.

Since at this time conditioned air that satisfies the first user air-conditioning environment C1 stored in advance and preferred by the first user U1 is blown, the first user U1 is able to save the time and effort for setting air-conditioning environment. Thus, convenience and comfort is improved. That is, a user is able to achieve a preferred air-conditioning environment only by standing in front of the indoor unit 100 and causing the indoor unit 100 to recognize the face of the user.

Immediately after blowing, the air flow of blown conditioned air can be regarded as the flux of a substantially uniform flow velocity having a cross section substantially the same size of an air outlet. However, since the air flow of blown conditioned air spreads inside the room 90 while being mixed with ambient air, the air flow when actually reaches the first user position P1 has a cross section larger than the size of the air outlet, and air flows of various flow directions and various flow velocities are found on the cross section.

Thus, the expressions "locally . . . in a concentrated manner" and "concentrated blowing" used in the present invention means that the center of air flow when spread air flow is averaged is "toward a specific position" and also means that conditioned air also reaches around the first user position P1.

Although both the right-side left/right air flow direction plate group 10R and the left-side left/right air flow direction plate group 10L blow conditioned air toward the first user position P1 in the description provided above, the outline of concentrated blowing in the present invention is not limited by the description provided above.

Figure 8B:
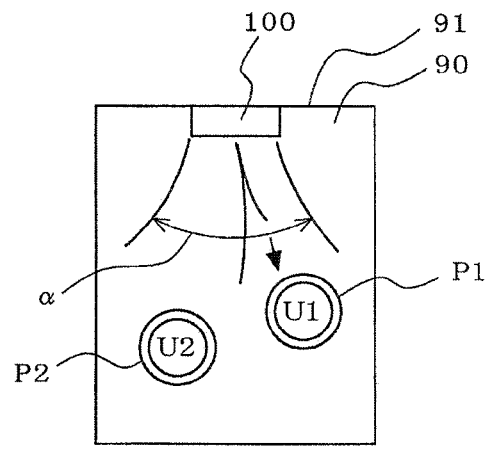
FIG. 8B is another plan view illustrating the flow of air in the air-conditioning environment control for the indoor unit of the air-conditioning apparatus according to Embodiment 1 of the present invention.

For example, as illustrated in FIG. 8B, the left-side left/right air flow direction plate group 10L may always be fixed to the attitude for blowing conditioned air toward the first user position P1 and the right-side left/right air flow direction plate group 10R may move rotationally (swing) so as to blow conditioned air while reciprocating within a specific range (represented by a in FIG. 8B) including the first user position P1 and a second user position P2 where the second user U2 is located.

In this case, a larger amount of conditioned air that satisfies the first user air-conditioning environment C1 is blown to the first user U1. Thus, the comfort to the first user U1 is improved, and a smaller amount of conditioned air that satisfies the first user air-conditioning environment C1 is intermittently blown to an area not including the first user position P1.

Thus, in the case where the second user U2 whose preferred air-conditioning environment (feeling temperature etc.) is different from the first user U1 is located at the second user position P2, which is different from the first user position P1, a smaller amount of conditioned air that satisfies the first user air-conditioning environment C1 is intermittently blown to the second user position P2. Accordingly, the comfort to the second user U2 is also maintained.

Figure 8C:
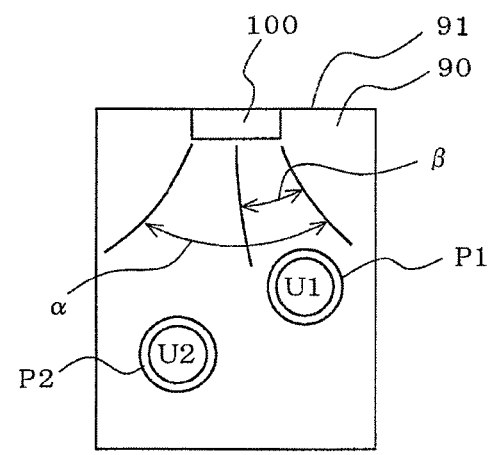
FIG. 8C is yet another plan view illustrating the flow of air in the air-conditioning environment control for the indoor unit of the air-conditioning apparatus according to Embodiment 1 of the present invention.

Furthermore, as illustrated in FIG. 8C, both the right-side left/right air flow direction plate group 10R and the left-side left/right air flow direction plate group 10L may move rotationally (swing) within a specific range (represented by α in FIG. 8C) including the first user position P1 and the second user position P2 to blow conditioned air, and for a range (represented by β in FIG. 8C) toward the first user position P1, the swing speed may be set to be slower (the blowing time may be set to be longer) than the area other than the range β. Accordingly, as in the case illustrated in FIG. 8B, the comfort to the first user U1 and the second user U2 whose preferred air-conditioning environments (feeling temperatures etc.) are different can be maintained.

Selection of the outline of concentrated blowing (selection among FIGS. 8A, 8B, and 8C) can be made in advance by the portable information terminal 70 (for example, when the first user U1 does not like concentrated blowing, the blowing outline illustrated in FIG. 8B is selected).

[Embodiment 2]

FIG. 10 is a flowchart for illustrating processing operations in air-conditioning environment control for an indoor unit of an air-conditioning apparatus according to Embodiment 2 of the present invention. The same portions and steps as those in Embodiment 1 are referred to with the same reference numerals and signs and part of description will be omitted.

An indoor unit of an air-conditioning apparatus (hereinafter, referred to as an indoor unit) 200 according to Embodiment 2 meets a user's demand for temporarily, quickly feeling cooler (or warmer) immediately after coming into a room immediately after taking a bath or from hot (or cold) outside.

That is, the indoor unit 100 according to Embodiment 1 tracks the movement of a user whose face is recognized and performs concentrated blowing toward a moved position of the user (see S10 in FIG. 6). In the indoor unit 100 according to Embodiment 1, for example, the first user U1 starts up the indoor unit 100 by causing the indoor unit 100 to recognize the face of the first user U1 immediately after taking a bath or immediately after entering the room. In the case where the first user U1 keeps standing at a close-range position P0 that is very close to the indoor unit 100 (representing a relatively narrow range including a position where the first user U1 is able to bring the face F1 into the face recognition range 52 and the face recognition range 52, see FIG. 5) and moves away from the close-range position P0 after a specific close-range determination time (for example, thirty seconds) has passed, concentrated blowing continues to be performed for the moved person who just finished taking a bath.

At this time, the case may exist in which the first user U1 does not desire concentrated blowing but desires diffused blowing even though concentrated blowing is stored as the first user air-conditioning environment C1. The indoor unit 200 according to Embodiment 2 deals with this case.

Referring to FIG. 10, the indoor unit 200 starts concentrated blowing toward the first user position P1 who is standing at the close-range position P0 (S10), and determines whether or not when the concentrated blowing continues to be performed (S10), a user (for example, the first user U1) keeps staying (keeps standing) at the close-range position P0 even after a specific close-range determination time (for example, thirty seconds) has passed (S31).

That is, since concentrated blowing toward the first user U1 continues to be performed for a specific close-range blowing time (for example, ten minutes), which is the time for completing cooling himself or herself, the first user U1 is able to cool himself or herself at the close-range position P0 (S32).

Then, after the close-range blowing time (for example, ten minutes) has passed, diffused blowing starts (see S20 in FIG. 7).

In the case where the first user U1 completes cooling himself or herself and moves away from the close-range position P0 before the close-range blowing time (for example, ten minutes) has passed (S33), diffused blowing starts at the time when the first user U1 moves away from the close-range position P0 (see S20 in FIG. 7).

Meanwhile, in the case where the first user U1 does not desire quick cooling (or heating) at the close-range position P0, after the face of the first user U1 is recognized at the close-range position P0, the first user U1 moves away from the close-range position P0 before the close-range determination time (for example, thirty seconds) has passed (S31).

In this case, similarly to the indoor unit 100 according to Embodiment 1, the movement of the first user U1 is tracked, concentrated blowing toward the first user position P1 (different from the close-range position P0) continues to be performed, and after a specific period of time (for example, thirty minutes) has passed, it is determined whether or not the first user U1 moves (moves away from the first user position P1) (see S13 in FIG. 7).

The processing operations after this determination is made are the same as those of the indoor unit 100 according to Embodiment 1 (continued to FIG. 7).

As described above, since the indoor unit 200 according to Embodiment 2 performs the individual steps (processing operations) described above, the first user U1 is able to quickly start up a refrigeration cycle only by standing at the close-range position P0, without operating a remote control, which is not illustrated, or the portable information terminal 70. Moreover, the first user U1 is able to be quickly cooled down or (warmed up) by concentrated blowing of conditioned air that satisfies the first user air-conditioning environment C1 by the time when the close-range blowing time has passed as long as the first user U1 keeps standing at the close-range position P0.

Furthermore, in the case where face information of a user is not stored in advance in a user face information database, the user is able to be quickly cooled down or (warmed up) by concentrated blowing of conditioned air that satisfies a standard air-conditioning environment by the time when the close-range blowing time has passed.

Then, after the close-range blowing time has passed or when the first user U1 (or a user whose face is not stored in the user face information database) moves away from the close-range position P0 (corresponding to the time by when cooling down can be regarded as being completed), concentrated blowing is cancelled, and diffused blowing starts.

Accordingly, a user (for example, the first user U1) is able to easily and quickly start to be cooled down or (warmed up), without operating a remote control or the portable information terminal 70. In addition, after cooling (or warming) himself or herself, the user is not exposed to the concentrated air flow, without operating the remote control or the portable information terminal 70. Thus, the user is able to enjoy comfort air-conditioning environment.

[Embodiment 3]

Figure 11:
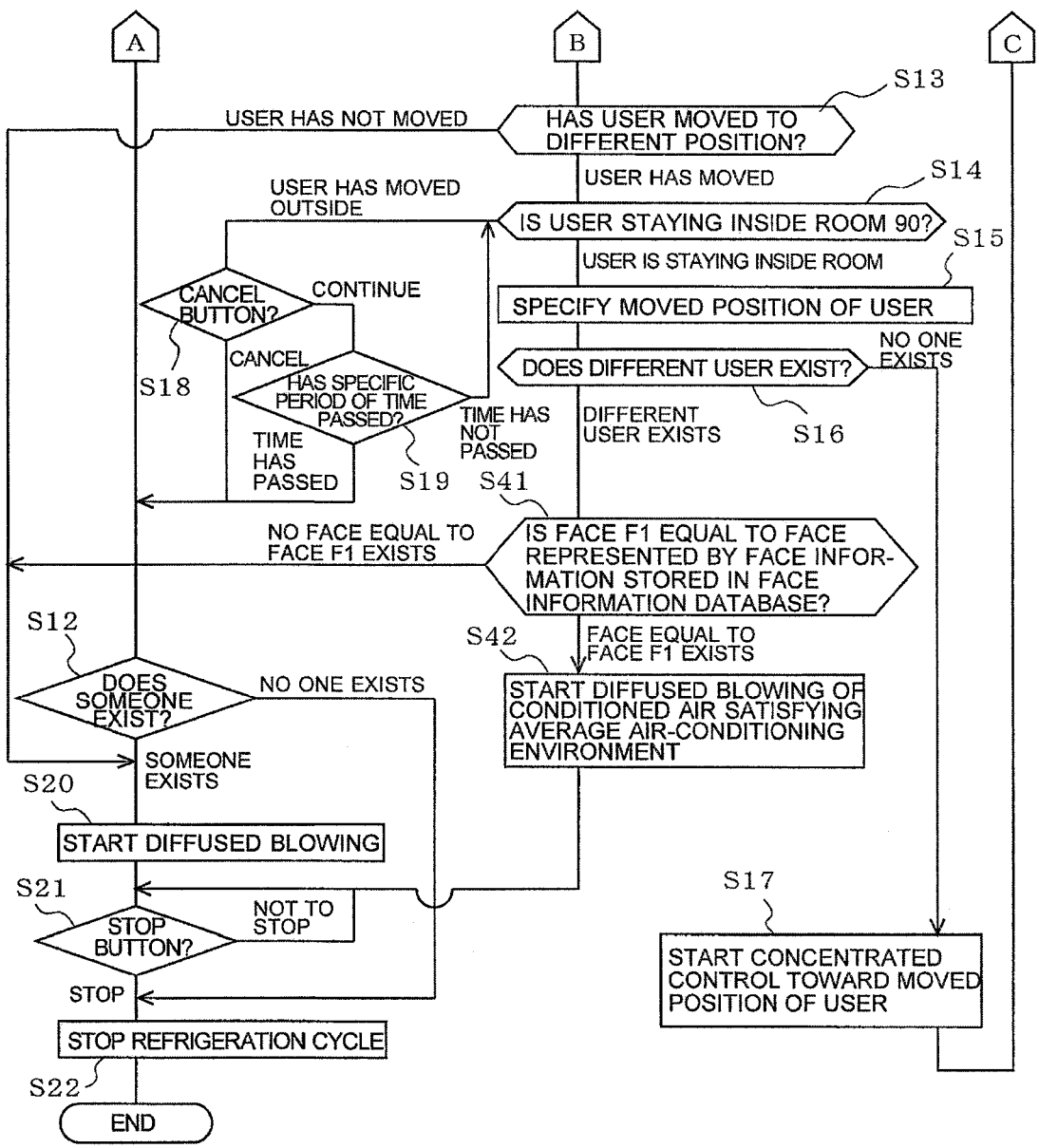
FIG. 11 is a flowchart for illustrating processing operations in air-conditioning environment control for an indoor unit of an air-conditioning apparatus according to Embodiment 3 of the present invention.

FIG. 11 is a flowchart for illustrating processing operations in air-conditioning environment control for an indoor unit of an air-conditioning apparatus according to Embodiment 3 of the present invention.

The indoor unit 100 of the air-conditioning apparatus according to Embodiment 1 blows air-conditioning air that satisfies the first user air-conditioning environment C1, which is an air-conditioning environment for the first user U1, in a diffused manner when a user (for example, the second user U2) who is different from a user (for example, the first user U1) whose face is recognized at the close-range position P0 is located inside the room where the indoor unit 100 is provided (S20 in FIG. 7).

Thus, for example, when an air-conditioning environment preferred by the second user U2 is a second user air-conditioning environment C2, which is different from the first user air-conditioning environment C1, the second user U2 may feel discomfort.

Referring to FIG. 11, in an indoor unit 300 of an air-conditioning apparatus according to Embodiment 3, in the case where a different user (for example, the second user U2) who is different from a user (for example, the first user U1) whose face is recognized at the close-range position P0 is located inside the room where the indoor unit 300 is provided (S16), the indoor unit 300 determines whether or not user face information and user air-conditioning information for the different user are stored. That is, the indoor unit 300 compares the face F2 of the different user (for example, the second user U2) imaged by the indoor imaging device 50, which captures an image inside the room, with each of faces represented by user face information stored in a user face information database, and determines whether or not the face F2 corresponds to any of the faces represented by the user face information stored in the user face information database (S41).

For example, in the case where it is determined that the face F2 corresponds to the face represented by the second user face information IF2, air-conditioning air that satisfies the average air-conditioning environment between the first user air-conditioning environment C1 for the first user U1 and the second user air-conditioning environment C2 for the second user U2 is blown in a diffused manner (S42).

In the case where it is determined that the face of the different user (for example, a ninth user U9) imaged by the indoor imaging device 50, which captures an image inside the room, does not corresponds to any of the faces represented by the user face information stored in the user face information database, air-conditioning air that satisfies the first user air-conditioning environment C1 for the first user U1 is blown in a diffused manner, as in Embodiment 1 (S20).

Accordingly, for example, in the case where an air-conditioning environment preferred by the second user U2 is the second user air-conditioning environment C2, which is different from the first user air-conditioning environment C1, the second user U2 is able to receive conditioned air that satisfies the average air-conditioning environment between the first user air-conditioning environment C1 and the second user air-conditioning environment C2, without being exposed to air-conditioning air that satisfies the first user air-conditioning environment C1. Thus, discomfort to the second user U2 can be reduced.

In the case where the second user U2 desires conditioned air that satisfies the second user air-conditioning environment C2 not conditioned air that satisfies the average air-conditioning environment between the first user air-conditioning environment C1 and the second user air-conditioning environment C2, the second user U2 may approach the indoor unit 300 to cause the indoor unit 300 to recognize the face F2 at the close-range position P0. Accordingly, conditioned air that satisfies the second user air-conditioning environment C2 is blown to the second user U2.

REFERENCE SIGNS LIST 1 main unit, 2 front panel, 3 air inlet, 4 heat exchanger, 4a heat exchanger front portion, 4b heat exchanger upper front portion, 4c heat exchanger upper rear portion, 5 fan, 6 air path, 7 air outlet, 8 drain pan, 8a upper surface, 8b lower surface, 9 up/down air flow direction plate, 9a front up/down air flow direction plate, 9b rear up/down air flow direction plate, 10 left/right air flow direction plate, 10L left-side left/right air flow direction plate group, 10R right-side left/right air flow direction plate group, 10a left/right air flow direction plate, 10h left/right air flow direction plate, 20L left-side connecting bar, 20R right-side connecting bar, 30L left-side driving means, 40 receiving device, 50 indoor imaging device, 51 field of view, 52 face recognition range, 60 controller, 70 portable information terminal, 71 face imaging means, 72 air-conditioning environment setting means, 73 transmitting means, 74 display unit, 90 inside room, 91 wall, 92 ceiling surface, 100 indoor unit (Embodiment 1), 200 indoor unit (Embodiment 2), 300 indoor unit (Embodiment 3).

The invention claimed is:

1. An indoor unit of an air-conditioning apparatus, the indoor unit comprising:
a main unit that includes an air inlet and an air outlet and that is mounted on a wall inside a room;
a fan that sucks indoor air from the air inlet and that forms an air path extending to the air outlet;
a heat exchanger that is arranged in the air path and that implements part of a refrigeration cycle;
an air flow direction adjusting device that is arranged at the air outlet and that adjusts a blowing direction of conditioned air in the heat exchanger;
an indoor imaging device that captures an image inside the room; and
a controller that controls at least one of the fan, the refrigeration cycle, and the air flow direction adjusting device on the basis of user face information and user air-conditioning information that are transmitted by a portable information terminal and the image captured by the indoor imaging device,
wherein when a face of a person is located within a face recognition range, which is a specific field of view, and the indoor imaging device recognizes the face of the person, the controller compares the face of the person with faces represented by the user face information that is stored in advance and that is transmitted from the portable information terminal, and in a case where the controller determines that the face of the person corresponds to a face of a specific user of the faces represented by the stored user face information, the controller controls at least one of the fan, the refrigeration cycle, and the air flow direction adjusting device to blow conditioned air that satisfies an air-conditioning environment represented by user air-conditioning information set for the specific user toward the person, wherein
the user face information and the user air-conditioning information include first user face information regarding a face of a first user, first user air-conditioning information set for the first user, second user face information regarding a face of a second user, and second user air-conditioning information set for the second user,
in a case where the controller determines that the face of the person recognized in the face recognition range corresponds to the face of the first user, the controller controls at least one of the fan, the refrigeration cycle, and the air flow direction adjusting device to blow conditioned air that satisfies an air-conditioning environment represented by the first user air-conditioning information toward the person for a specific exclusive time, the specific exclusive time is a nonzero period of time, and
in a case where the controller determines that a different person who is different from the person whose face is recognized in the face recognition range is located inside the room after the specific exclusive time has passed and determines that a face of the different person who is different from the person whose face is recognized in the face recognition range corresponds to the face of the second user, the controller controls at least one of the fan, the refrigeration cycle, and the air flow direction adjusting device to blow conditioned air that satisfies an average air-conditioning environment between the air-conditioning environment represented by the first user air-conditioning information and an air-conditioning environment represented by the second user air-conditioning information toward inside the room.

2. The indoor unit of the air-conditioning apparatus of claim 1, wherein when the controller recognizes the face of the person while the refrigeration cycle is not operating, the controller starts up the refrigeration cycle.

3. The indoor unit of the air-conditioning apparatus of claim 1, wherein when the person whose face is recognized moves, the controller tracks the person, specifies a position of the person, and controls at least one of the fan, the refrigeration cycle, and the air flow direction adjusting device to send the conditioned air toward the specified position.

4. The indoor unit of the air-conditioning apparatus of claim 1, wherein in a case where the controller determines that the person whose face is recognized in the face recognition range moves outside the room while the controller is controlling any of the fan, the refrigeration cycle, and the air flow direction adjusting device, the controller continues to perform the control until a specific duration has passed since the determination, and stops performing the control when the specific duration has passed.

5. The indoor unit of the air-conditioning apparatus of claim 1, wherein the controller controls the air flow direction adjusting device to send a larger amount of conditioned air or send the conditioned air for a longer time toward a specified position than a position distant from the specified position.

6. The indoor unit of the air-conditioning apparatus of claim 1, wherein in a case where the controller determines that the person whose face is recognized in the face recognition range is still located at the specified position even after a specific time has passed while the controller is controlling any of the fan, the refrigeration cycle, and the air flow direction adjusting device, the controller controls the air flow direction adjusting device to send the conditioned air substantially uniformly inside the room.

7. The indoor unit of the air-conditioning apparatus of claim 1, wherein the indoor imaging device is a charge coupled device (CCD) camera having 1,000,000 pixels or less.

8. The indoor unit of the air-conditioning apparatus of claim 1, wherein the air flow direction adjusting device includes at least one pair of up/down air flow direction plates that adjusts an up/down blowing direction of the conditioned air and one pair of left/right air flow direction plates that adjusts a left/right blowing direction of the conditioned air.

9. The indoor unit of the air-conditioning apparatus of claim 1,
wherein the portable information terminal includes
face imaging part for imaging a face of a user,
air-conditioning environment setting part which a user sets an air-conditioning environment, and
transmitting part for transmitting the user face information regarding the face of the user imaged by the face imaging part and the user air-conditioning information regarding the air-conditioning environment set by the air-conditioning environment setting part.

10. The indoor unit of the air-conditioning apparatus of claim 1, wherein
in a case where the controller controls at least one of the fan, the refrigeration cycle, and the air flow direction adjusting device to blow conditioned air that satisfies the average air-conditioning environment, the controller is further configured to
recognize the second user is within the face recognition range,
override the average air-conditioning environment in response to recognizing that the second user is within the face recognition range, and
control at least one of the fan, the refrigeration cycle, and the air flow direction adjusting device to blow conditioned air that satisfies an air-conditioning environment represented by the second user air-conditioning information.

11. An indoor unit of an air-conditioning apparatus, the indoor unit comprising:
a main unit that includes an air inlet and an air outlet and that is mounted on a wall inside a room;
a fan that sucks indoor air from the air inlet and that forms an air path extending to the air outlet;
a heat exchanger that is arranged in the air path and that implements part of a refrigeration cycle;
an air flow direction adjusting device that is arranged at the air outlet and that adjusts a blowing direction of conditioned air in the heat exchanger;
an indoor imaging device that captures an image inside the room; and
a controller that controls at least one of the fan, the refrigeration cycle, and the air flow direction adjusting device on the basis of user face information and user air-conditioning information that are stored and the image captured by the indoor imaging device, wherein
the stored user face information and user air-conditioning information are transmitted by a portable information terminal,
the user face information and the user air-conditioning information include first user face information regarding a face of a first user, first user air-conditioning information set for the first user, second user face information regarding a face of a second user, and second user air-conditioning information set for the second user, and
the controller performs controls of:
a step of receiving user face information regarding a face of a user imaged by the portable information terminal and user air-conditioning information regarding an air-conditioning environment set for the user by the portable information terminal,
a step of storing the received user face information and user air-conditioning information,
a step of recognizing a face of a person when the face of the person is located within a face recognition range in the field of view of the indoor imaging device during a specific face recognition time,
a step of starting up, in a case where the face of the person recognized in the recognizing step is compared with faces represented by the user face information and it is determined that the face of the person corresponds to a face of a specific user of the faces represented by the stored user face information, the refrigeration cycle when the refrigeration cycle is stopped, and controlling at least one of the fan, the refrigeration cycle, and the air flow direction adjusting device to blow conditioned air that satisfies an air-conditioning environment represented by user air-conditioning information set for the specific user toward the person after the refrigeration cycle is started up or when the refrigeration cycle is operating,
a blowing stopping step of stopping the refrigeration cycle in a case where the person whose face is recognized in the face recognition range moves outside a close-range position, which is a relatively narrow range including the face recognition range, after the conditioned air is blown and before a specific close-range determination time has passed, in a case where a specific close-range blowing time has passed after the conditioned air is blown, or in a case where the person whose face is recognized moves outside the close-range position before the close-range blowing time has passed,
a step of controlling of starting up, in a case where the face of the person located in the face recognition range is compared with the faces represented by the user face information and it is determined that the face of the person corresponds to the face of the first user, the refrigeration cycle when the refrigeration cycle is stopped, and controlling at least one of the fan, the refrigeration cycle, and the air flow direction adjusting device to blow conditioned air that satisfies an air-conditioning environment represented by the first user air-conditioning information toward the user until a specific exclusive time has passed after the refrigeration is started up or when the refrigeration cycle is operating, the specific exclusive time is a nonzero period of time, and
a step of controlling, in a case where it is determined that the person whose face is recognized in the face recognition range and a different person who is different from the person whose face is recognized in the face recognition range are located inside the room after the specific exclusive time has passed and it is determined that a face of the different person who is different from the person whose face is recognized in the face recognition range corresponds to the face of the second user, at least one of the fan, the refrigeration cycle, and the air flow direction adjusting device to blow conditioned air that satisfies an average air-conditioning environment between the air-conditioning environment represented by the first user air-conditioning information and an air-conditioning environment represented by the second user air-conditioning information toward inside the room.

12. The indoor unit of the air-conditioning apparatus of claim 11, wherein the indoor imaging device is a charge coupled device (CCD) camera having 1,000,000 pixels or less.

13. The indoor unit of the air-conditioning apparatus of claim 11, wherein the air flow direction adjusting device includes at least one pair of up/down air flow direction plates that adjusts an up/down blowing direction of the conditioned air and one pair of left/right air flow direction plates that adjusts a left/right blowing direction of the conditioned air.

14. The indoor unit of the air-conditioning apparatus of claim 11,
wherein the portable information terminal includes
face imaging part for imaging a face of a user,
air-conditioning environment setting part which a user sets an air-conditioning environment, and
transmitting part for transmitting the user face information regarding the face of the user imaged by the face imaging part and the user air-conditioning information regarding the air-conditioning environment set by the air-conditioning environment setting part.

15. The indoor unit of the air-conditioning apparatus of claim 11, wherein
in a case where the controller controls at least one of the fan, the refrigeration cycle, and the air flow direction adjusting device to blow conditioned air that satisfies the average air-conditioning environment, the controller is further configured to
recognize the second user is within the face recognition range,
override the average air-conditioning environment in response to recognizing that the second user is within the face recognition range, and
control at least one of the fan, the refrigeration cycle, and the air flow direction adjusting device to blow conditioned air that satisfies an air-conditioning environment represented by the second user air-conditioning information.

* * * * *